United States Patent
Gauthier et al.

(10) Patent No.: US 7,062,688 B2
(45) Date of Patent: Jun. 13, 2006

(54) UPDATING HIGH SPEED PARALLEL I/O INTERFACES BASED ON COUNTERS

(75) Inventors: Claude R. Gauthier, Fremont, CA (US); Aninda K. Roy, San Jose, CA (US); Brian W. Amick, Ausitn, TX (US); Dean Liu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 446 days.

(21) Appl. No.: 10/196,384

(22) Filed: Jul. 16, 2002

(65) Prior Publication Data

US 2004/0015751 A1   Jan. 22, 2004

(51) Int. Cl.
*G01R 31/28* (2006.01)

(52) U.S. Cl. .................. 714/712; 714/715; 714/719

(58) Field of Classification Search ............... 714/712, 714/703, 704, 715, 716, 719, 724, 731, 735; 370/508, 429; 375/355
See application file for complete search history.

(56) References Cited

U.S. PATENT DOCUMENTS

| | | | | |
|---|---|---|---|---|
| 4,451,916 A | | 5/1984 | Casper et al. | |
| 4,542,380 A | * | 9/1985 | Beckner et al. | 340/825.5 |
| 4,545,013 A | * | 10/1985 | Lyon et al. | 714/712 |
| 4,562,573 A | * | 12/1985 | Murano et al. | 370/508 |
| 4,731,588 A | | 3/1988 | Addis et al. | |
| 5,844,762 A | | 12/1998 | Yamamura et al. | |
| 5,956,349 A | * | 9/1999 | Watanabe et al. | 714/718 |
| 5,963,023 A | | 10/1999 | Herrell et al. | |
| 6,345,365 B1 | | 2/2002 | Takahashi et al. | |
| 6,400,724 B1 | * | 6/2002 | Yao | 370/429 |
| 6,463,109 B1 | * | 10/2002 | McCormack et al. | 375/355 |
| 6,700,390 B1 | | 3/2004 | Gauthier et al. | |
| 6,781,355 B1 | | 8/2004 | Gauthier et al. | |
| 6,822,345 B1 | | 11/2004 | Gauthier et al. | |
| 6,842,351 B1 | | 1/2005 | Gauthier et al. | |
| 6,909,203 B1 | | 6/2005 | Gauthier et al. | |
| 2003/0107452 A1 | | 6/2003 | Novak | |
| 2003/0197430 A1 | | 10/2003 | Gauthier et al. | |
| 2003/0222655 A1 | | 12/2003 | Gauthier et al. | |
| 2004/0049708 A1 | | 3/2004 | Thomas et al. | |
| 2004/0076025 A1 | | 4/2004 | Gauthier et al. | |

(Continued)

OTHER PUBLICATIONS

Na et al., "The Effects of On-Chip and Package Decoupling Capacitors and an Efficient ASIC Decoupling Methodology", IEEE, 2004.

(Continued)

*Primary Examiner*—Albert DeCady
*Assistant Examiner*—Fritz Alphonse
(74) *Attorney, Agent, or Firm*—Osha-Liang LLP (57) ABSTRACT

A technique for adjusting a communication system involves a link, where the link includes a data line arranged to transmit a data signal and a clock line adapted to transmit a clock signal. The technique uses one or more counters to test the transmission across the link. Dependent on one or more of these counters, a test circuit, connected to the link, compares a known test pattern signal to a latched test pattern signal transmitted on the data line. The test circuit includes an adjustment circuit arranged to generate an adjustable clock signal from the clock signal, where the adjustable clock signal determines when to latch the transmitted test pattern signal The test circuit adjusts a timing of the adjustable clock signal relative to the data signal of the link.

18 Claims, 6 Drawing Sheets

U.S. PATENT DOCUMENTS

| | | |
|---|---|---|
| 2004/0123166 A1 | 6/2004 | Gauthier et al. |
| 2004/0124715 A1 | 7/2004 | Huang et al. |
| 2004/0165406 A1 | 8/2004 | Gauthier et al. |
| 2004/0169571 A1 | 9/2004 | Chang et al. |
| 2005/0110551 A1 | 5/2005 | Bonaccio et al. |

OTHER PUBLICATIONS

Bai et al., "Simultaneous Switching Noise and Resonance Analysis of On-Chip Power Distribution Network", IEEE, 2002.

Na et al., "Modeling and Simulation of Core Switching Noise for ASICs", IEEE, 2002.

Garben et al., "Frequency Dependencies of Power Noise", IEEE, 2002.

O'Sullivan et al., "Developing a Decoupling Methodology with SPICE for Multilayer Circuit Boards", IEEE, 1998.

Jong et al., "Modeling and Simulation of Switching Noise Including Power/Ground Plance Resonance for High Speed GaAs FET Logic (FL) Circuits", IEEE, 1995.

* cited by examiner

UPDATING HIGH SPEED PARALLEL I/O INTERFACES BASED ON COUNTERS

BACKGROUND OF INVENTION

As the frequencies of modern computers continue to increase, the need to rapidly transmit data between chip interfaces also increases. To accurately receive data, a clock signal is often transmitted to help recover the data. The clock signal determines when the data signal should be sampled by a receiver's circuits.

The transmitted clock signal may transition at the beginning of the time the data is valid; however, the receiver's circuits should latch the data during the middle of the time the data is valid. Also, the transmission of the clock signal may degrade as it travels from its transmission point. In both circumstances, a delay locked loop, or DLL, can regenerate a copy of the clock signal at a fixed phase shift from the original.

Figure 1:
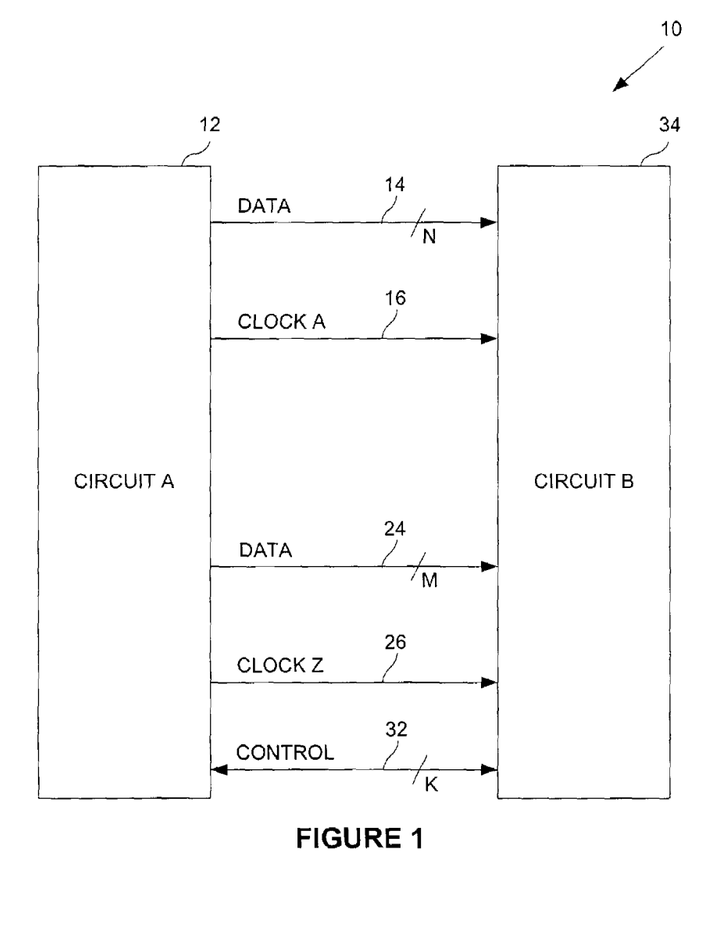
FIG. 1 shows a block diagram of a conventional communication system.

FIG. 1 shows a block diagram of a typical communication system (10). The communication system (10) includes multiple links. Each link may include multiple data lines and an associated clock line. Data lines (14) that are N bits wide connect between circuit A (12) and circuit B (34). To aid in the recovery of transmitted data on the data lines (14), a clock signal on clock line A (16) is transmitted with data signals on the data lines (14). Another link includes data lines (24) that are M bits wide and a clock line Z (26). A clock signal on the clock line Z (26) is transmitted with data signals on the data lines (24) to determine when the data signals on the data lines (24) should be latched.

Data signals on the data lines (14, 24) are transmitted from circuit A (12) to circuit B (34). Circuit A (12) and circuit B (34) could also have one or more links to transmit data from circuit B (34) to circuit A (12) along with one or more additional clock signals (not shown).

The data signals and clock signals transmit information from circuit A (12) to circuit B (34) under the direction of control signals. The control signals are transmitted between circuit A (12) and circuit B (34) on control lines (32) that are K bits wide. The control signals may determine on which cycle, what frequency, and/or under which operating mode the data signals and clock signals should be transmitted. The control signals may carry a request that circuit A (12) transmit a predetermined test pattern to circuit B (34) to test and improve transmission across the link.

Figure 2:
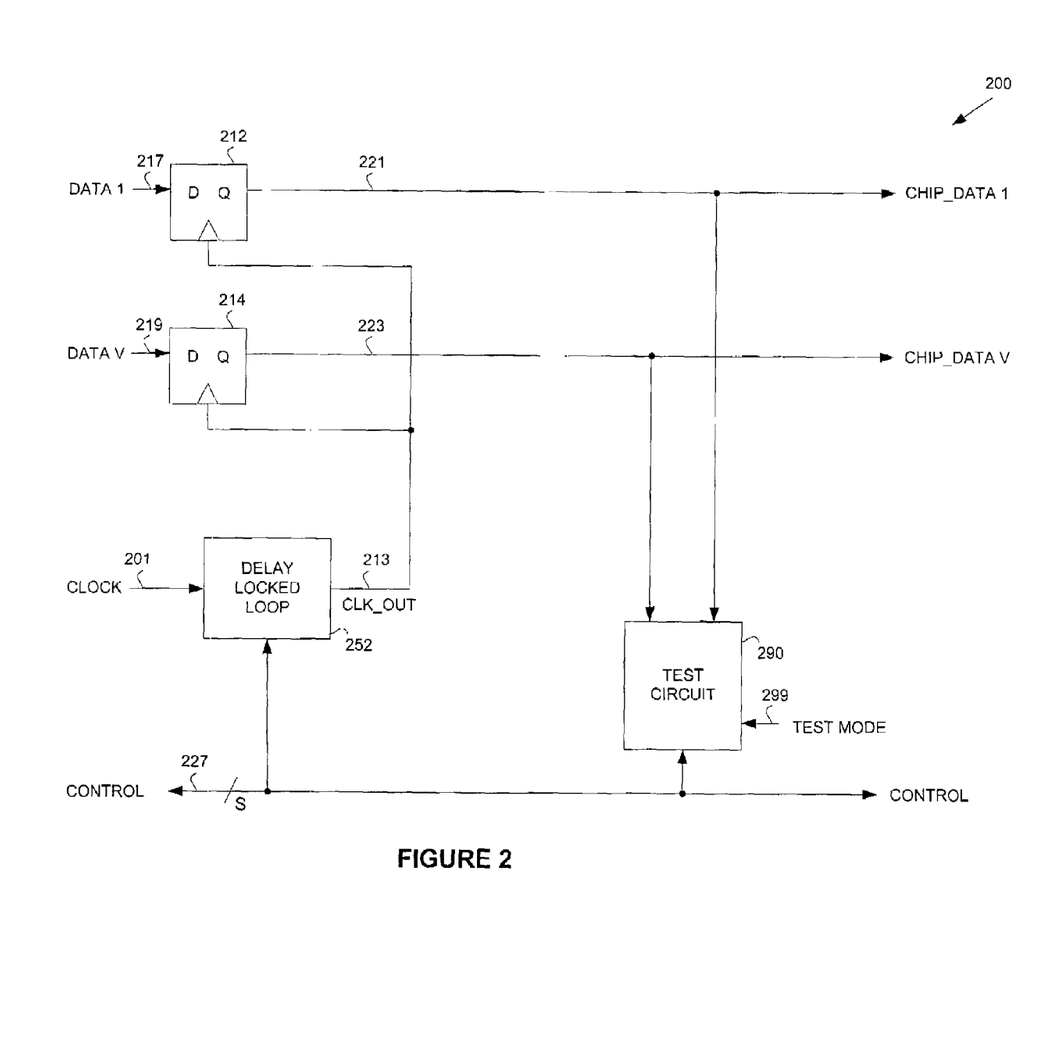
FIG. 2 shows a block diagram of a conventional receiver.

In FIG. 2, a block diagram of a typical receiver (200) is shown. A clock signal (201) is input to a DLL (252) in order for the DLL (252) to generate a phased output, clk_out signal (213). The clk_out signal (213) from the delay locked loop (252) provides a phase delayed copy of the clock signal (201) to other circuits (i.e., clk_out signal (213)).

The data signals on data (217) through data line V (219) arrive at flip-flop (212) through flip-flop (214), respectively. The data signals on data line 1 (217) through data line V (219) are latched depending on the arrival time of the clk_out signal (213) to generate latched data signals on chip_data line 1 (221) through chip_data line V (223), respectively. Depending on the arrival time of the clk_out signal (213), some or all of the latched data signals may not equal the same state as the data signals on data line 1 (217) through data line V (219).

A test circuit (290) is used to improve the link efficiency. The test circuit (290) tests and adjusts the link in response to a test signal (299). The test circuit (290) is used to test and improve transmission across the link that includes clock signal (201) and data lines (217, 219). A predetermined test pattern signal is transmitted on the data lines (217, 219) under the direction of the control signals (227) that are S bits wide. As mentioned earlier, the test pattern signal is latched by the flip-flops (212, 214) based on the clk_out signal (213). The resulting latched test pattern signals on chip_data (221) through chip_data line V (223) are compared with the predetermined test pattern signal by the test circuit (290).

In FIG. 2, the test circuit (290) controls and coordinates the activities of the test sequence. The test circuit (290) adjusts the clk_out signal (213) to select a timing of the clk_out signal (213) relative to the test pattern signals on data line 1 (217) through data line V (219). The latched test pattern signals on chip_data line 1 (221) through chip_data line V (223) are compared with the test pattern signal by the test circuit (290) to determine whether the latched test pattern signals are the same as the test pattern signals.

The test circuit (290) may select a different delay value for the clk_out signal (213) and repeat the transmission of the test pattern signal, the latching of the test pattern signal, and the comparing of the test pattern signal to the latched test pattern signal. A set of tests with different selected delay values for the clk_out signal (213) may indicate a best selected delay value or a range of selected delay values for the clk_out signal (213). The test circuit (290) fixes the selected delay value for the clk_out signal (213) to improve transmission across the link. Data signals transmitted across the link under non-test conditions may have a higher probability of successful transmission after the delay value of the clk_out signal (213) is appropriately selected.

Figure 3:
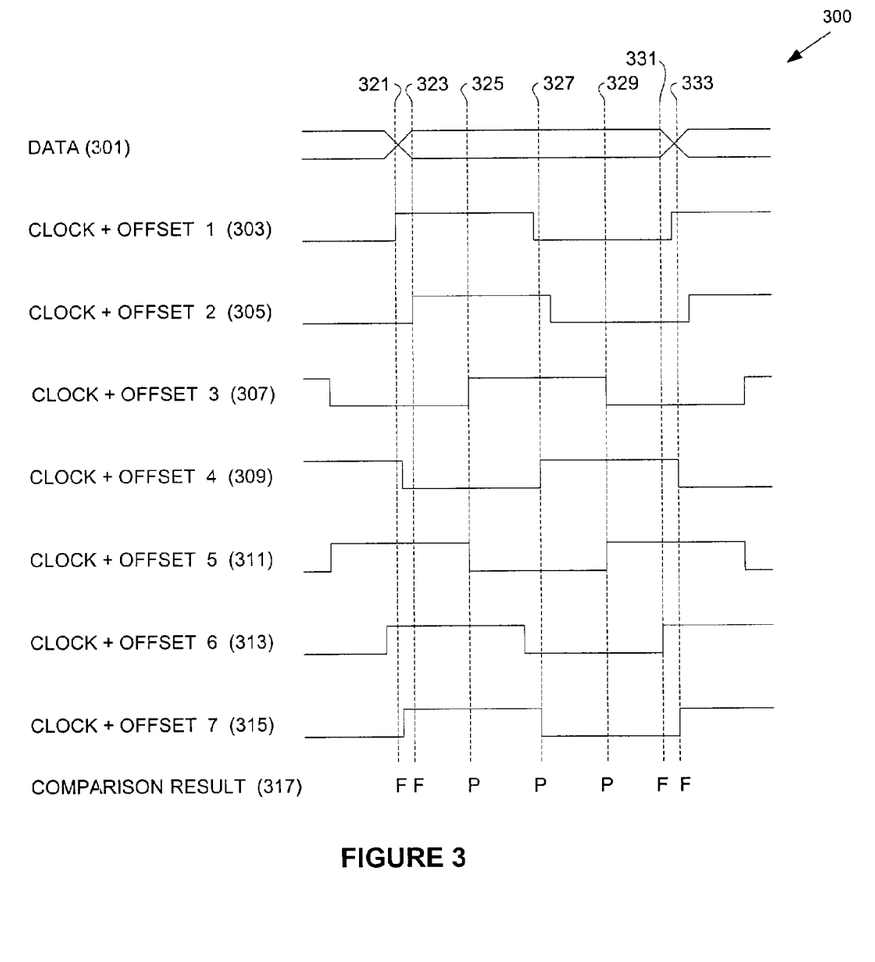
FIG. 3 shows a timing diagram for one data line of a conventional communication system.

In FIG. 3, an exemplary timing diagram (300) is shown for one clock cycle of a test pattern signal on one data line (301). Multiple offset values are added to a clock signal to generate multiple adjustable clock signals (303, 305, 307, 309, 311, 313, 315) relative to the one clock cycle of the test pattern signal. The test pattern signal is latched according to a rising edge of the adjustable clock signal (303, 305, 307, 309, 311, 313, or 315). A rising edge of each of the multiple adjustable clock signals (303, 305, 307, 309, 311, 313, 315) is indicated by the vertical lines (321, 323, 325, 327, 329, 331, 333), respectively.

The adjustable clock signals (303, 305, 313, 315) and signal on the data line (301) may jitter. Because the adjustable clock signals (303, 305, 313, 315) are temporally located near the beginning or end of the test pattern signal transmission, the latched test pattern signal may not be correct (i.e., a fail). The setup and hold times for the latch are not satisfied. Because the adjustable clock signals (307, 309, 311) are temporally located near the middle of the test pattern signal transmission, the latched test pattern signal may be correct (i.e., a pass). The pass (P) or fail (F) condition is shown as comparison results (317). The pass (P) or fail (F) condition for a link may be based on tests of multiple data lines, multiple cycles of test patterns, and/or repeated test patterns.

The testing of a link is performed during the power-on reset of a central processing unit (CPU) or, more generally, an integrated circuit. Once the value for the offset signal has been determined, it is fixed for the duration of the CPU operation until power is removed or cycled. As the communication system characteristics change due to temperature, voltage, and/or aging effects, the delay value for the clk_out signal (213 in FIG. 2) may not maintain a desired temporal position to latch the incoming data.

SUMMARY OF INVENTION

According to one aspect of the present invention, a communication system including a first link where the first link comprises a first data line arranged to transmit a first data signal and a first clock line arranged to transmit a first clock signal; a first latch device arranged to latch the first data signal; and a first test circuit operatively connected to the first link where the first test circuit is arranged to test the first link, the first test circuit including a first adjustment circuit arranged to generate a first adjustable clock signal based on the first clock signal where the first adjustment circuit is arranged to adjust a timing of the first adjustable clock signal relative to the first data signal when the first link is tested, and where the first latch device is responsive to the first adjustable clock signal, and a first pattern comparator arranged to compare a first latched test pattern signal to a first test pattern signal where the first latch device is arranged to latch the first test pattern signal from the first data line to generate the first latched test pattern signal; and a counter where the first test circuit is arranged to test the first link based on the counter.

According to one aspect of the present invention, a communication system updating method including testing a first adjustable clock signal for a first link including transmitting a first test pattern signal on a first data line of the first link, latching the first test pattern signal based on the first adjustable clock signal to generate a first latched test pattern signal, comparing the first latched test pattern signal to the first test pattern signal, and adjusting a first offset of the first adjustable clock signal based on the comparing the first latched test pattern signal; and determining when the testing the first adjustable clock signal occurs based on a counter.

According to one aspect of the present invention, a communication system including means for testing an adjustable clock signal for a link including means for transmitting a test pattern signal on a data line of the link, means for latching the test pattern signal based on the adjustable clock signal to generate a latched test pattern signal, means for comparing the latched test pattern signal to the test pattern signal, and means for adjusting an offset of the adjustable clock based on the means for comparing; and means for determining when the means for testing occurs.

Other aspects and advantages of the invention will be apparent from the following description and the appended claims.

DETAILED DESCRIPTION

Embodiments of the present invention relate to a communication system having at least one link. The link includes at least one data line and a clock line. On the link, a data signal on the at least one data line is transmitted along with a clock signal on the clock signal line (i.e., source synchronous transmission). A test circuit connected to the link adjusts the timing of a delayed copy of the clock signal to determine when the data signal should be latched. A predetermined test pattern is used to identify which bits are not correctly latched.

Embodiments of the present invention use at least one counter to determine when the delay of the clock signal is tested and updated. The at least one counter indicates to a processor that a predetermined interval has elapsed. In the prior art, the testing of a link is performed only during the power-on reset of the integrated circuit. In the present invention, the at least one counter is arranged such that a link may be tested periodically while the integrated circuit is powered.

Figure 4:
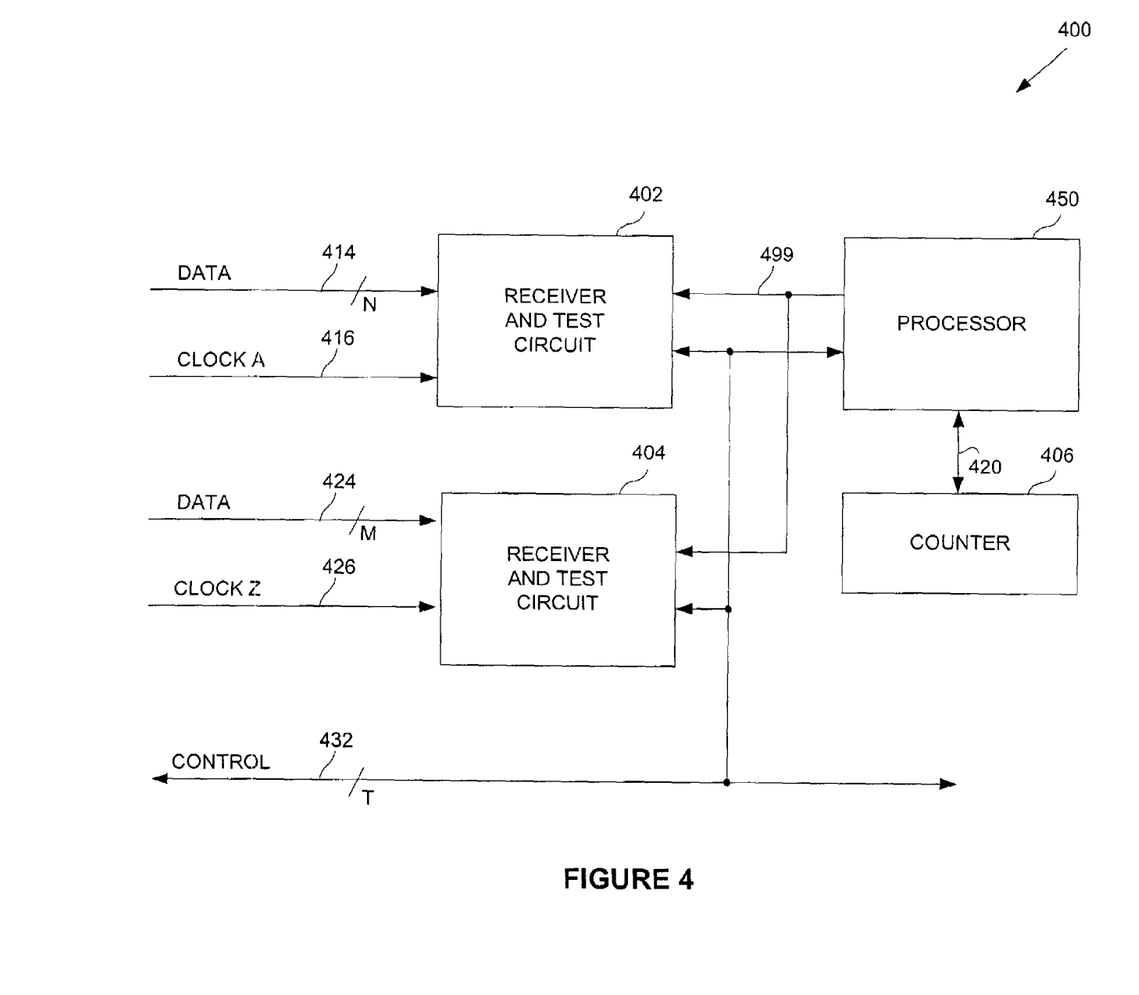
FIG. 4 shows a block diagram of a communication system in accordance with an embodiment of the present invention.

FIG. 4 shows a block diagram of an exemplary communication system (400) in accordance with an embodiment of the present invention. The communication system (400) includes multiple links. Each link may include multiple data lines and an associated clock line. Data lines (414) that are N bits wide and a clock line A (416) are input into circuit (402). To aid in the recovery of transmitted data on the data lines (414), a clock signal on the clock line A (416) is also transmitted with the data signals on data lines (414). Another link includes data lines (424) that are M bits wide and a clock line Z (426) that input into a circuit (404). A clock signal on the clock line Z (426) is transmitted with data signals on the data lines (424) to determine when the data signals on the data lines (424) should be latched. A DLL (not shown) for each of the circuits (402, 404) allows a copy of the clock signals on the clock lines (416, 426) to be properly aligned to latch the data signals on the data lines (414, 424), respectively.

The data signals and clock signals for the links shown in FIG. 4 are transmitted to the circuits (402, 404) under the direction of control signals on control lines (432). The control signals, transmitted between the transmitting circuit (not shown) and the circuits (402, 404), are T bits wide. The control signals may determine in which cycle, what frequency, and/or under which operating mode the data signals and clock signals should be transmitted. The control signals may request that the transmitting circuit (not shown) transmit a predetermined test pattern to either the circuit (402) or the circuit (404), or both, to test and improve transmission across the links.

The circuit (402) includes a receiver circuit (not shown) that latches the data based on a delayed copy of the clock signal on clock line A (416). The circuit (402) also includes a test circuit (not shown) that can compare a transmitted test pattern signal to a latched test pattern signal and adjust an adjustable clock signal (not shown) to improve the link's efficiency. The receiver (200 in FIG. 2) is representative of the circuit (402). The circuit (404) includes the same functionality as circuit (402).

In an embodiment of the present invention, a counter (406) is included in the communication system (400). In the prior art, the testing of a link is performed only during the power-on reset of the integrated circuit. In the present invention, the counter (406) is arranged such that a link may be tested periodically while the integrated circuit is powered.

The counter (406) is connected to a processor (450) using signal line(s) (420). The processor (450) is also connected to the control lines (432) that are T bits wide. The counter (406) may indicate to the processor (450) that a certain number of counts, clock cycles, instructions cycles, or time intervals have elapsed. The counter (406) may indicate to the processor (450) that a certain amount of data has been received.

The processor (450) may then indicate that the circuits (402, 404) should test their links using a test mode signal (499).

In one or more embodiments, the circuits (402, 404) using the control lines (432) may change its links from transmitting "normal" data (i.e., non-test data) to instead transmitting test pattern signals.

In one or more embodiments, the processor (450), using control lines (432), may instruct the transmitting circuits (not shown) to stop transmitting "normal" data (i.e., non-test data).

In one or more embodiments, after receiving an indication from the counter (406) that retesting should occur, the processor (450) may skip the retesting of the links depending on the activity level of the transmission links or whether the CPU is busy.

In one or more embodiments, the counter (406) may reset itself and continue counting after indicating to the processor (450) that retesting should occur. In one or more embodiments, the processor (450) may reset the counter (406) after retesting has been initiated, is progressing, or has completed.

One of ordinary skill in the art will understand that control lines (432) may be used in place of the test mode signal (499) to determine when the circuits (402, 404) should test their associated links.

One of ordinary skill in the art will appreciate that circuits (402, 404) may be associated with one or more links of the multiple, parallel links.

Figure 5:
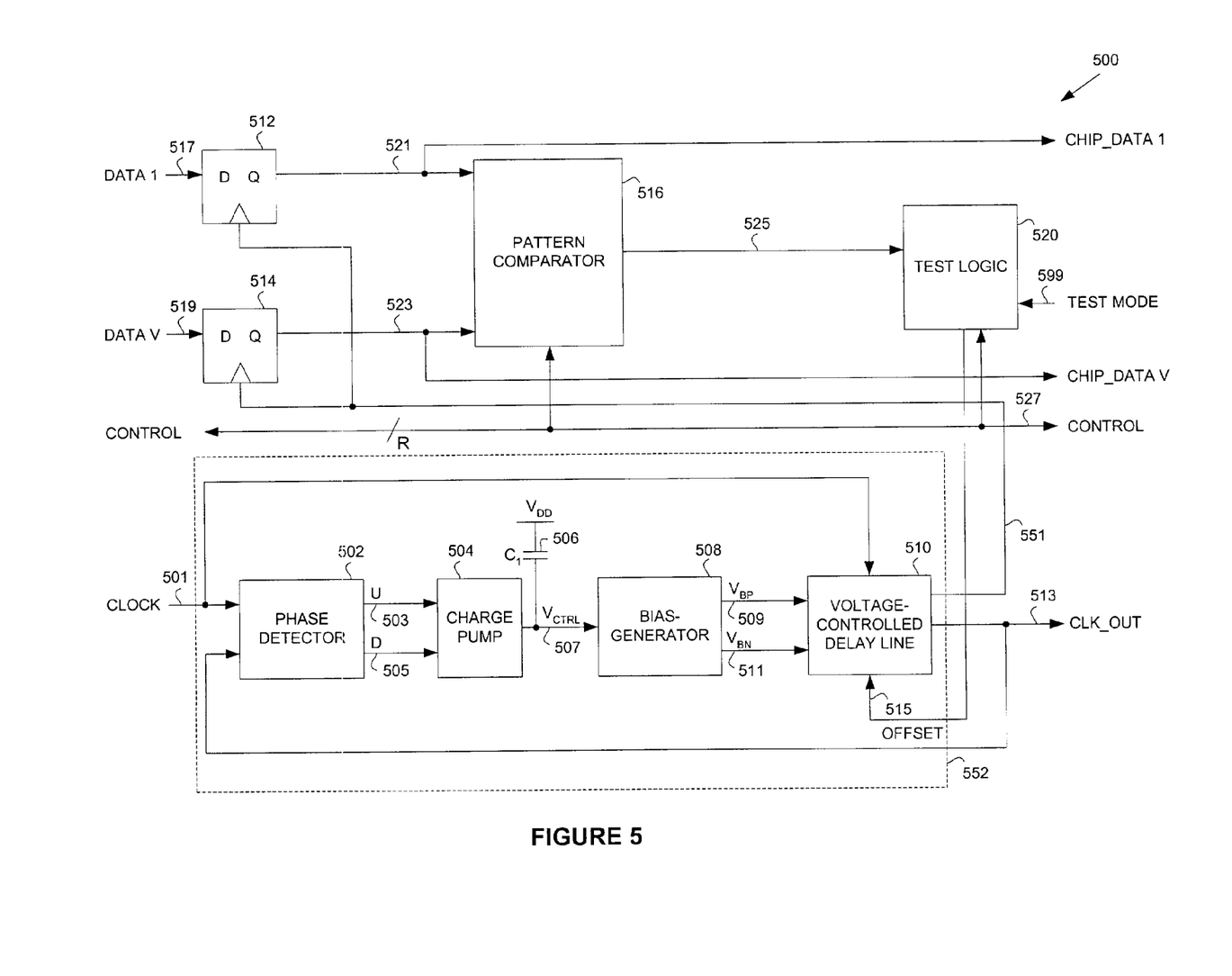
FIG. 5 shows a block diagram of a communication system in accordance with an embodiment of the present invention.

In FIG. 5, a block diagram of an exemplary receiver (500) is shown. A clock signal (501) is input to a DLL (552) in order for the DLL (552) to generate a phased output, clk_out signal (513). The clock signal (501) is used as an input to a voltage-controlled delay line (510) and to a phase detector (502). The phase detector (502) measures whether the phase difference between the clock signal (501) and clk_out signal (513) of the delay path is correct. An adjustment in the phase delay produces signals that control a charge pump (504). The phase detector (502) indicates that the charge pump (504) should increase or decrease its output using up pulses U (503) and down pulses D (505). The charge pump (504) adds or removes charge from a capacitor $C_1$ (506) that changes a voltage potential at the input of a bias-generator (508). The capacitor (506) is connected between a power supply $V_{DD}$ and a control voltage $V_{CTRL}$ (507). In response to the control voltage $V_{CTRL}$ (507), the bias-generator (508) produces control voltages $V_{BP}$ (509) and $V_{BN}$ (511) that control the delay of the voltage-controlled delay line (510).

The voltage-controlled delay line (510) may be implemented using current starved elements. This means that the delays are controlled by modifying the amount of current available for charging and discharging capacitances. The linearity of a voltage-controlled delay line's characteristics determines the stable range of frequencies over which the DLL can operate. The clk_out signal (513) from the voltage-controlled delay line (510) provides a phase delayed copy of the clock signal (501) to other circuits.

Still referring to FIG. 5, the negative feedback of the clk_out signal (513) adjusts the delay through the voltage-controlled delay line (510). The phase detector (502) integrates the phase error that results between the periodic input of the clock signal (501) and clk_out signal (513). The voltage-controlled delay line (510), in response to the phase detector (502), delays the clk_out signal (513) by a fixed amount of time such that a desired delay between the clock signal (501) and the clk_out signal (513) is maintained.

The voltage-controlled delay line (510) also has an offset signal (515). The value of the offset signal (515) determines which tap should be used in the voltage-controlled delay line (510) to generate an adjustable clock signal (551). The offset signal (515) may be an analog signal, or a serial or parallel digital signal. While the DLL maintains a fixed delay between the clock signal (501) and the clk_out signal (513), the value of the offset signal (515) adjusts the delay between the clock signal (501) and the adjustable clock signal (551). The adjustable clock signal (551) determines when to latch the incoming data signals on data (517) through data line V (519).

The adjustable clock signal (551) may be generated from a digital or an analog delay line in place of the voltage-controlled delay line (510). In other embodiments, the adjustable clock signal (551) may be generated from a digital or an analog delay line connected to the clk_out signal (513) outside of the feedback loop. The digital or the analog delay lines in these embodiments generate the adjustable clock signal (551) based on the value of the offset signal (515). In other embodiments, the value of the offset signal (515) may be used to determine at which point in the delay line to tap.

The data signals on data line 1 (517) through data line V (519) arrive at flip-flop (512) through flip-flop (514), respectively. The data signals on data line 1 (517) through data line V (519) are latched depending on the arrival time of the adjustable clock (551) to generate latched data signals on chip_data line 1 (521) through chip_data line V (523), respectively. Depending on the arrival time of the adjustable clock signal (551), some or all of the latched data signals may not equal the same state as the data signals on data (517) through data line V (519).

A pattern comparator (516) is used to test and improve transmission across the link that includes clock signal (501) and data lines (517, 519). A predetermined test pattern signal is transmitted on the data lines (517, 519) under the direction of the control signals (527) that are R bits wide. In some embodiments, the test pattern signal may be transmitted for only one cycle. In other embodiments, the test pattern signal may have a duration that lasts for many cycles on one or more of the data lines (517, 519). As mentioned earlier, the test pattern signal is latched by the flip-flops (512, 514) based on the adjustable clock signal (551). The resulting latched test pattern signals on chip_data (521) through chip_data line V (523) are compared with the predetermined test pattern signal by the pattern comparator (516).

A test circuit is used to improve the link efficiency. The test circuit includes the pattern comparator (516), an adjustment circuit to adjust the adjustable clock signal (551), and test logic (520). In response to a test mode signal (599), the test circuit tests and adjusts the link. In an embodiment of the present invention, the test mode signal (599) may be generated by a processor. Furthermore, the processor may initiate the test mode in response to a counter.

In FIG. 5, the adjustment circuit is part of the voltage-controlled delay line (510). The value of the offset signal (515) may select from one of several taps in the delay chain of the voltage-controlled delay line (510) to generate the adjustable clock signal (551). The test logic (520) controls and coordinates the activities of the test sequence.

The test logic (520) selects a value of the offset signal (515) to select a timing of the adjustable clock signal (551) relative to the test pattern signals on data (517) through data line V (519). The latched test pattern signals on chip_data (521) through chip_data line V (523) are compared with the test pattern signal by the pattern comparator (516) to determine whether the latched test pattern signals are the same as the test pattern signals. The pattern comparator (516) may send comparison results on signal line (525) to the test logic (520) that indicate a pass or fail, or the number of bits that were not the same.

The test logic (520) may select a different value for the offset signal (515) and repeat the transmission of the test pattern signal, the latching of the test pattern signal, and the comparing of the test pattern signal to the latched test pattern signal. The pattern comparator (516) sends the results on signal line (525) to the test logic (520). A set of tests with different selected values for the offset signal (515) may indicate a best selected value or a range of selected values for the offset signal (515). The test logic (520) fixes the selected value for the offset signal (515) to improve transmission across the link. Data signals transmitted across the link under non-test conditions may have a higher probability of successful transmission after the value of the offset signal (515) is appropriately selected.

Figure 6:
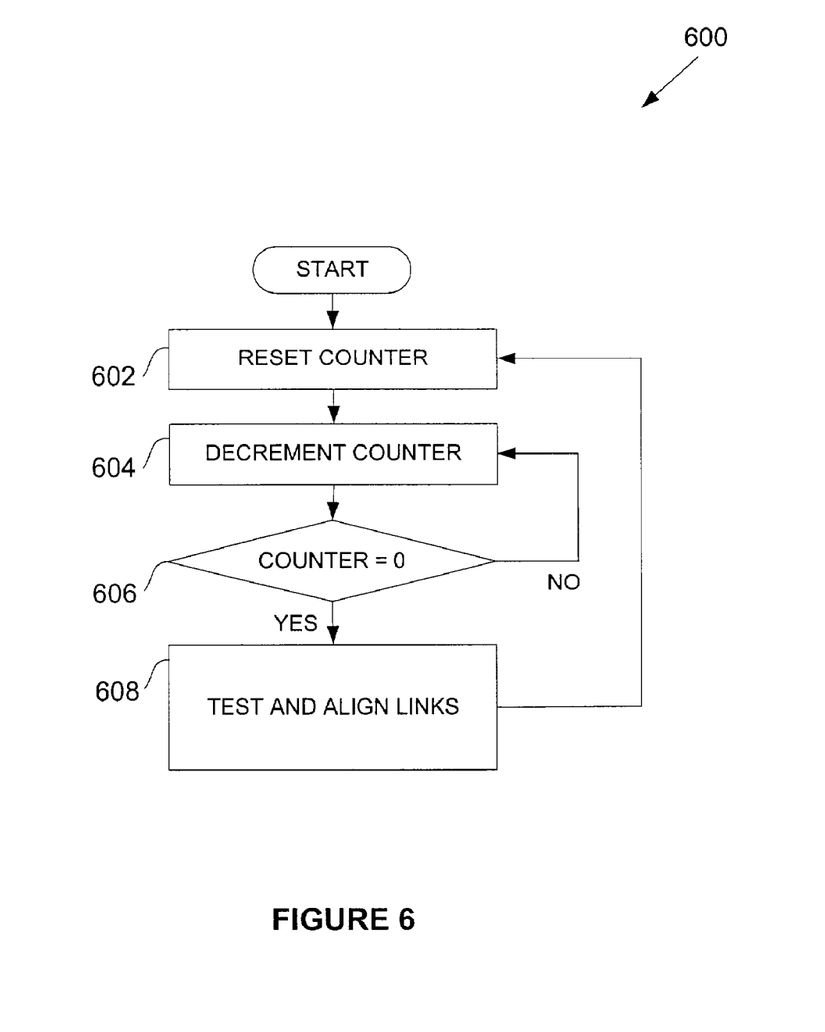
FIG. 6 shows a flow diagram in accordance with an embodiment of the present invention.

FIG. 6 shows an exemplary flow diagram (600) in accordance with an embodiment of the present invention. The flow diagram (600) shows a technique for implementing testing based on a counter. A counter determines a minimum number of cycles that should occur between tests of the links. The counter is set with the number of cycles that should at least occur between tests of the links at (602). The counter is decremented by one at (604) on each cycle. The counter is compared to zero at (606). If the counter has not decremented to zero, the counter is again decremented by one in the next cycle at (604). If the counter is decremented to zero, the links are tested to align the each clock associated with each link to an appropriate temporal position relative to the transmitted data associated with the links (608).

The alignment of the links (608) may cause the processor to instruct the transmitting circuits to stop transmitting "normal" data. The alignment of the links (608) may wait for some additional period of time before testing the link. The alignment of the links (608) may be skipped and the counter reset.

After the test of the links (608) is indicated, is in progress or has completed, the counter is reset to a value equal to the minimum number of cycles between tests.

Advantages of embodiments of the present invention may include one or more of the following. In one or more embodiments, because a link may be adjusted to align the link's clock edge relative to the link's data, the link may transmit data with fewer erroneous bits. The testing may occur for multiple links to ensure that all the links may transmit data with fewer erroneous bits.

In one or more embodiments, links may be periodically tested to align the associated clock with the data for the links. The period between tests is determined by at least one counter.

In one or more embodiments, testing of the links may occur not just on the initial power-up of the integrated circuit, but also on a periodic basis throughout the time the integrated circuit is in operation. The period between tests is determined by at least one counter. Because the links may be periodically tested, any change in the characteristics of the communication system due to temperature, voltage, and/or aging effects may be observed and the links appropriately adjusted.

In one or more embodiments, under the direction of control signals, a link that is transmitting "normal" data may complete transmitting its current buffered data and allow transmission of test pattern signals.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A communication system, comprising:
   a first link, wherein the first link comprises a first data line arranged to transmit a first data signal and a first clock line arranged to transmit a first clock signal;
   a first latch device arranged to latch the first data signal; and
   a first test circuit operatively connected to the first link, wherein the first test circuit is arranged to test the first link, the first test circuit comprising:
      a first adjustment circuit arranged to generate a first adjustable clock signal based on the first clock signal, wherein the first adjustment circuit is arranged to adjust a timing of the first adjustable clock signal relative to the first data signal when the first link is tested, and wherein the first latch device is responsive to the first adjustable clock signal, and
      a first pattern comparator arranged to compare a first latched test pattern signal to a first test pattern signal, wherein the first latch device is arranged to latch the first test pattern signal from the first data line to generate the first latched test pattern signal; and
   a counter, wherein the first link is periodically testable by the first test circuit based on the counter.

2. The communication system of claim 1, further comprising:
   a second link, wherein the second link comprises a second data line arranged to transmit a second data signal and a second clock line arranged to transmit a second clock signal;
   a second latch device arranged to latch the second data signal; and
   a second test circuit operatively connected to the second link, wherein the second test circuit is arranged to test the second link, the second test circuit comprising:
      a second adjustment circuit arranged to generate a second adjustable clock signal based on the second clock signal, wherein the second adjustment circuit is arranged to adjust a timing of the second adjustable clock signal relative to the second data signal when the second link is tested, and wherein the second latch device is responsive to the second adjustable clock signal, and
      a second pattern comparator arranged to compare a second latched test pattern signal to a second test pattern signal, wherein the second latch device is arranged to latch the second test pattern signal from the second data line to generate the second latched test pattern signal; and
   wherein the second test circuit is arranged to test the second link based on the counter.

3. The communication system of claim 1, further comprising:
   a processor, responsive to the counter, arranged to initiate a test of the first link.

4. The communication system of claim 3, wherein the processor is arranged to cause the first test pattern signal to be transmitted on the first link.

5. The communication system of claim 1, wherein the first test circuit is arranged to cause the first test pattern signal to be transmitted on the first link.

6. The communication system of claim 1, wherein the counter is arranged to set a minimum duration between the first test circuit testing the first link a first time and a second time.

7. The communication system of claim 1, wherein the counter counts one selected from the group consisting of clock cycles, instructions, and a quantity of received data.

8. The communication system of claim 1, wherein the counter counts a time interval.

9. The communication system of claim 1, wherein the first adjustable clock signal is generated from one selected from the group consisting of a voltage controlled delay line, a digital delay line, and an analog delay line.

10. A communication system updating method, comprising:
   testing a first link, comprising:
      transmitting a first test pattern signal on a first data line of the first link,
      latching the first test pattern signal based on a first adjustable clock signal to generate a first latched test pattern signal,
      comparing the first latched test pattern signal to the first test pattern signal, and
      adjusting a first offset of the first adjustable clock signal based on the comparing the first latched test pattern signal; and during operation of the communication system, periodically requesting the testing to occur based on a counter.

11. The method of claim 10, further comprising:
testing a second link, comprising:
   transmitting a second test pattern signal on a second data line of the second link,
   latching the second test pattern signal based on a second adjustable clock signal to generate a second latched test pattern signal,
   comparing the second latched test pattern signal to the second test pattern signal, and
   adjusting a second offset of the second adjustable clock signal based on the comparing the second latched test pattern signal; and
wherein the testing the second adjustable clock signal occurs based on the counter.

12. The method of claim 10, further comprising:
using a processor to initiate the testing.

13. The method of claim 12, wherein the transmitting the first test pattern signal is initiated by the processor.

14. The method of claim 10, wherein the counter determines a minimum duration between the testing a first time and a second time.

15. The method of claim 10, wherein the counter counts one selected from the group consisting of clock cycles, instructions, and a quantity of received data.

16. The method of claim 10, wherein the counter counts a time interval.

17. The method of claim 10, wherein the adjusting the first offset uses at least one selected from the group consisting of a voltage-controlled delay line, a digital delay line, and an analog delay line.

18. A communication system, comprising:
   means for testing a link, comprising:
      means for transmitting a test pattern signal on a data line of the link,
      means for latching the test pattern signal based on an adjustable clock signal to generate a latched test pattern signal,
      means for comparing the latched test pattern signal to the test pattern signal, and
      means for adjusting an offset of the adjustable clock based on the means for comparing; and means for counting,
   wherein the link, during operation of the communication system, is periodically testable by the means for testing dependent on the means for counting.

* * * * *